United States Patent Office 2,789,617
Patented Apr. 23, 1957

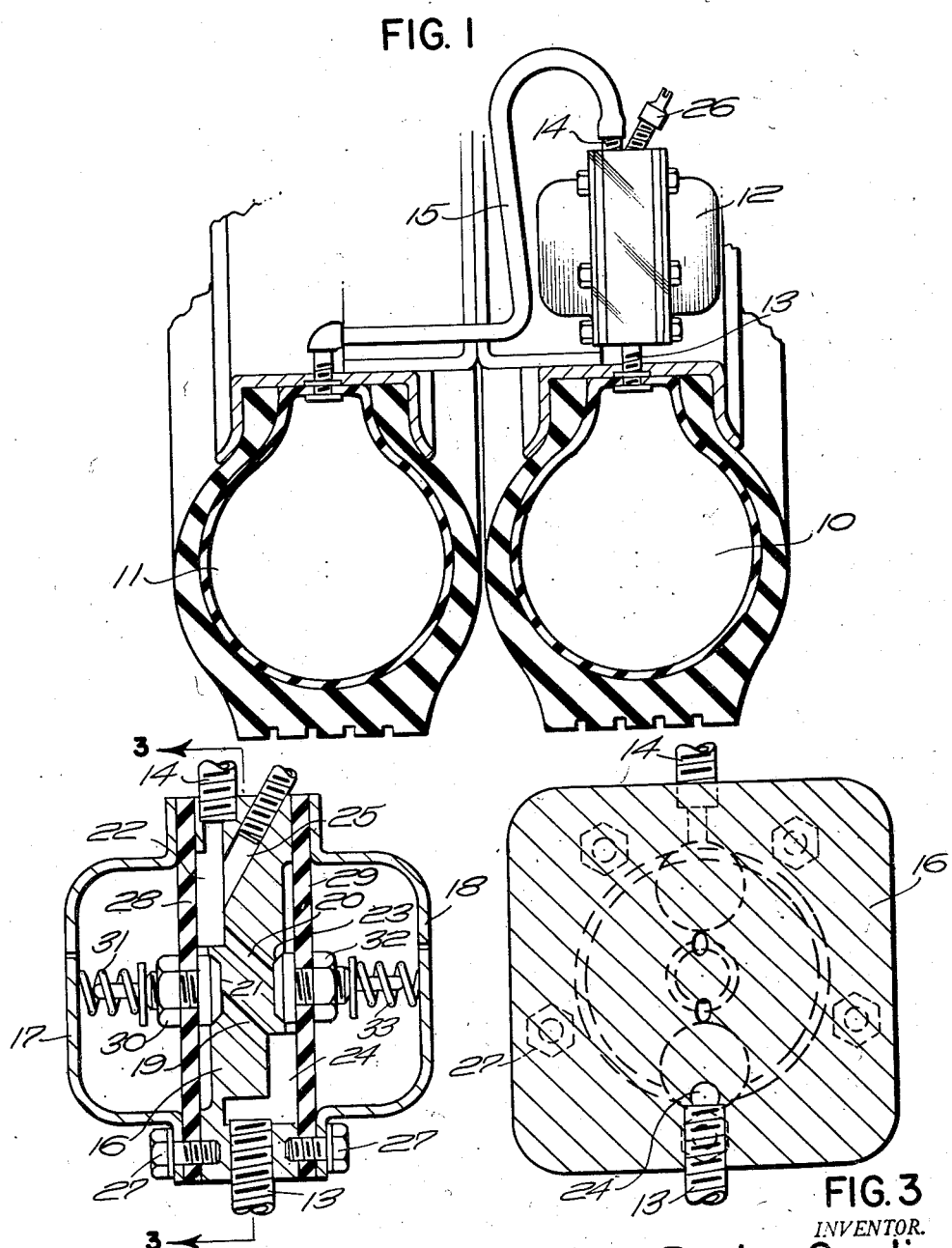

2,789,617

PRESSURE EQUALIZING VALVE

Paul Cardi, Cranston, R. I.

Application August 27, 1954, Serial No. 452,509

6 Claims. (Cl. 152—415)

My present invention relates to tire valves and more particularly to a novel construction of pressure equalizing valve.

The principal object of the present invention is to provide a single valve construction for dual tires of a motor vehicle.

Another object of the present invention is to provide a pressure equalizing valve which will permit the equalization of pressure in dual tires during the operation of the vehicle.

A further object of the present invention is to provide a valve which will so balance the pressure in a pair of dual tires as to reduce the danger of blow-outs and prevent excessive wear.

Another object of the present invention is to provide a pressure equalizing valve which will prevent one of the dual tires from going flat as the other of the dual tires loses its air by a blow-out or otherwise.

Another object of the present invention is to provide a pressure equalizing valve which is simple in construction, easy and economical to manufacture and assemble and easy to mount on a motor vehicle.

With the above and other objects and advantageous features in view, my invention consists of a novel arrangement of parts, more fully disclosed in the detailed description following, in conjunction with the accompanying drawings, and more particularly defined in the appended claims.

In the drawings:

Fig. 1 is a sectional view of a pair of dual tires, together with the valve embodying the present invention.

Fig. 2 is an enlarged transverse section of the pressure equalizing valve, and

Fig. 3 is a section taken on line 3—3 on Fig. 2.

Dual tires on commercial vehicles have given considerable trouble because of the impossibility of properly balancing the air pressure to meet different road conditions. Attempts have been made to put pressure equalizers on such dual tires, but these merely insure the inflation of both tires to an equal pressure. However, when the vehicle is on the road, a high crowned road will put an undue strain on one of the tires, causing it to heat and expand with increased pressure. This will tend to lift the other of the dual tires partially off the road and result in excessive wear of the first tire.

Referring to the drawings illustrating my invention, Fig. 1 shows the position of the valve with respect to the dual tires. For purposes of illustration the valve is shown in larger proportion than the tires, the valve being approximately full size and the tires being greatly reduced. In the construction shown the dual wheel mounting normally comprises a pair of identical tires, an outer tire 10 and an inner tire 11. The valve 12 of the present invention is mounted in the outer wheel assembly within easy reach. One air outlet 13 is connected to the outer tire 10 and another air outlet 14 is connected to a flexible line 15 communicating with the inner tire 11.

The valve 12 comprises a central wall portion 16 and a pair of equal housings 17 and 18 forming equal chambers on each side of the central wall portion. The central wall portion 16 is provided with a passageway 19 extending from approximately the center of one side of the wall 16 at an angle therethrough. A second passageway 20 is in spaced parallel relation with the first passageway with one end approximately in the center of the other side of the wall 16. The passageway 19 is provided with a valve seat 21 at its central end communicating with a chamber 22. The passageway 20 is provided with a valve seat 23 at its central end communicating with a chamber 24. The tire connection 13 extends into one end of the wall 16 in communication with the chamber 24 and the tire connection 14 extends through the opposite side of the wall 16 in communication with the chamber 22. Adjacent the connection 14, the wall 16 is provided with a passageway 25 also communicating with the chamber 22 and terminating at its outer end with a conventional tire inflating valve 26.

On each side of the wall 16 the housings 17 and 18 are attached by means of bolts 27 which pass through the outer edges of diaphragms 28 and 29. Mounted in the center of the diaphragm 28 is a valve 30 normally seating in the valve seat 21. A spring 31 extends from the valve to the housing to resiliently retain the diaphragm in the position shown in Fig. 2 with the valve in its seat. Similarly, as valve 32 is mounted in the center of the diaphragm 29 and seats in the valve seat 23. The spring 33 retains the diaphragm and valve in position.

With the parts assembled as hereinabove described it is obvious that the chamber 22 communicates through the passageway 19 with the chamber 24, the passageway being controlled by the diaphragm 28 and valve 30. Also, the chamber 24 communicates through the passageway 20 with the chamber 22, the passageway being controlled by the diaphragm 29 and valve 32. Now if a source of air pressure is applied to the valve 26 the air will enter the chamber 22 through the passageway 25 and will also pass through the tube 15 to inflate the inner tire 11. At the same time the diaphragm 28 will be lifted moving the valve 30 from the seat 21 and allowing the air to pass through the passageway 19 and chamber 24 into the outer tire 10. Simultaneously the air in the chamber 24 will lift the diaphragm 29 and open the valve 32 allowing the air to pass through the passageway 20. With both valves open the air will pass freely through the valve 12 and permit equal inflation of both tires.

Now assuming that it is necessary to inflate these tires to a pressure of ninety pounds for the vehicle and the expected load, it will be necessary to determine the minimum pressure at which one of these tires will support the weight of the vehicle. Let us assume that this pressure is sixty-five pounds. The springs 31 and 33 are therefore pre-set so that they will bear against the valves 30 and 32 with sixty-five pounds pressure. When the air pressure is admitted through the valve 26 both diaphragms will be easily pushed back to inflate the tires to ninety pounds. When the vehicle is in use, one of the tires may lose as much as ten pounds of air. Normally, this will mean that the other tire will bear the heavier portion of the load and it will result in excessive wear and possibly a blowout of the fully inflated tire. However, the valve of the present invention will cause the pressure to immediately equalize. For example, assume that the inner tire 11 has lost ten pounds of pressure. The ninety pounds of pressure in the outer tire tank will pass through the chamber 24 and easily unseat the valve 32 against the sixty-five pounds pressure of the spring 33. The air will then flow freely through the passageway 20 to the inner tire 11 until the pressure is equalized.

If the outer tire 10 has lost some air pressure, the pressure in the inner tire 11 will lift the valve 30 and the air will flow through the passageway 19 to the outer tire 10 to again balance the pressure. It is quite possible that with both tires inflated to a pressure of over sixty-five pounds that the valves 30 and 32 will never completely seat against the respective valve seats and thus allow free movement of the air in both directions.

Now, assume that one of the tires, such as the inner tire 11 blows out and loses its air completely. The valve 30 will close immediately inasmuch as there is no pressure in the chamber 22 and sixty-five pounds pressure of the spring 31 will force the valve into closed position. The valve 32 will permit air from the outer tire 10 to flow through the passageway 20 and out through the other tire only until the pressure in the tire 10 reaches sixty-five pounds. At this point, the spring 33 will close the valve and prevent any further movement of air from the tire 10. The vehicle will thus be supported on the outer tire until the other tire is repaired. Similarly, if the outer tire blows, air will flow from the inner tire until the sixty-five pounds pressure is reached.

Now, assume that the vehicle is riding on an uneven road surface so that the inner tire 11 is bearing a greater share of the load. This will cause overheating of the tire 11 and a greatly increased pressure. Again, the valves will function so that the pressure will move into the outer tire 10 and equalize so that the outer tire can bear its share of the load on the road surface.

The valve of the present invention thus provides a means for permitting the air pressure in a pair of dual tires to automatically equalize under different road conditions and thus prevent excessive wear of the tires and blowouts. The valve is simple in construction and can readily be assembled at a minimum of cost. Other advantages of the present invention will be readily apparent to a person skilled in the art.

I claim:

1. A pressure equalizer for a pair of dual tires comprising a housing, a central wall portion separating said housing into two equal chambers, said wall portion having a pair of spaced passageways extending therethrough, valve means in one chamber controlling the passage of air through one of said passageways and valve means in the other chamber controlling the passage of air through the other of said passageways, air passageway means communicating one side of said wall portion with one of the dual tires and air passageway means communicating the other side of said wall portion with the other dual tire, and an air inlet communicating with one side of said wall portion for introducing air under pressure into said housing.

2. A pressure equalizer for a pair of dual tires comprising a housing, a central wall portion separating said housing into two equal chambers, said wall portion having a pair of spaced passageways extending therethrough, valve means in one chamber controlling the passage of air through one of said passageways and valve means in the other chamber controlling the passage of air through the other of said passageways, air passageway means communicating one side of said wall portion with one of the dual tires and air passageway means communicating the other side of said wall portion with the other dual tire, and an air inlet communicating with one side of said wall portion for introducing air under pressure into said housing, said valve means closing said passageways at a predetermined minimum pressure and opening said passageways at pressures exceeding said minimum.

3. A pressure equalizer for a pair of dual tires comprising a housing, a central wall portion separating said housing into two equal chambers, said wall portion having a pair of spaced passageways extending therethrough, valve means in one chamber controlling the passage of air through one of said pasageways and valve means in the other chamber controlling the passage of air through the other of said passageways, air passageway means communicating one side of said wall portion with one of the dual tires and air passageway means communicating the other side of said wall portion with the other dual tire, and an air inlet communicating with one side of said wall portion for introducing air under pressure into said housing, said valve means including a diaphragm mounted in each chamber in spaced parallel relation to said wall portion, and a valve mounted on each diaphragm adapted to seat over the end of the passageway controlled by each valve means.

4. A pressure equalizer for a pair of dual tires comprising a housing, a central wall portion separating said housing into two equal chambers, said wall portion having a pair of spaced passageways extending therethrough, valve means in one chamber controlling the passage of air through one of said passageways and valve means in the other chamber controlling the passage of air through the other of said passageways, air passageway means communicating one side of said wall portion with one of the dual tires and air passageway means communicating the other side of said wall portion with the other dual tire, and an air inlet communicating with one side of said wall portion for introducing air under pressure into said housing, said valve means closing said passageways at a predetermined minimum pressure and opening said passageways at pressures exceeding said minimum, said valve means including a diaphragm mounted in each chamber in spaced parallel relation to said wall portion, and a valve mounted on each diaphragm adapted to seat over the end of the passageway controlled by each valve means.

5. A pressure equalizer for a pair of dual tires comprising a housing, a central wall portion separating said housing into two equal chambers, said wall portion having a pair of spaced passageways extending therethrough, valve means in one chamber controlling the passage of air through one of said passageways and valve means in the other chamber controlling the passage of air through the other of said passageways, air passageway means communicating one side of said wall portion with one of the dual tires and air passageway means communicating the other side of said wall portion with the other dual tire, and an air inlet communicating with one side of said wall portion for introducing air under pressure into said housing, said valve means including a diaphragm mounted in each chamber in spaced parallel relation to said wall portion, and a valve mounted on each diaphragm adapted to seat over the end of the passageway controlled by each valve means, and a spring behind said diaphragm urging said valve into closed position.

6. A pressure equalizer for a pair of dual tires comprising a housing, a central wall portion separating said housing into two equal chambers, said wall portion having a pair of spaced passageways extending therethrough, valve means in one chamber controlling the passage of air through one of said passageways and valve means in the other chamber controlling the passage of air through the other of said passageways, air passageway means communicating one side of said wall portion with one of the dual tires and air passageway means communicating the other side of said wall portion with the other dual tire, and an air inlet communicating with one side of said wall portion for introducing air under pressure into said housing, said valve means closing said passageways at a predetermined minimum pressure and opening said passageways at pressures exceeding said minimum, said valve means including a diaphragm mounted in each chamber in spaced parallel relation to said wall portion, and a valve mounted on each diaphragm adapted to seat over the end of the passageway controlled by each valve means.

References Cited in the file of this patent

UNITED STATES PATENTS

| Number | Name | Date |
|---|---|---|
| 1,849,139 | Denmire | Mar. 15, 1932 |
| 1,882,455 | Spicer | Oct. 11, 1932 |
| 1,931,637 | Wahl | Oct. 24, 1933 |
| 2,206,737 | Tomsic | July 2, 1940 |
| 2,577,458 | Gaiptman | Dec. 4, 1951 |